Aug. 30, 1949.  I. N. HEWITT  2,480,366
VALVE STEM PUSHING IMPLEMENT
Filed Jan. 16, 1946  2 Sheets-Sheet 1
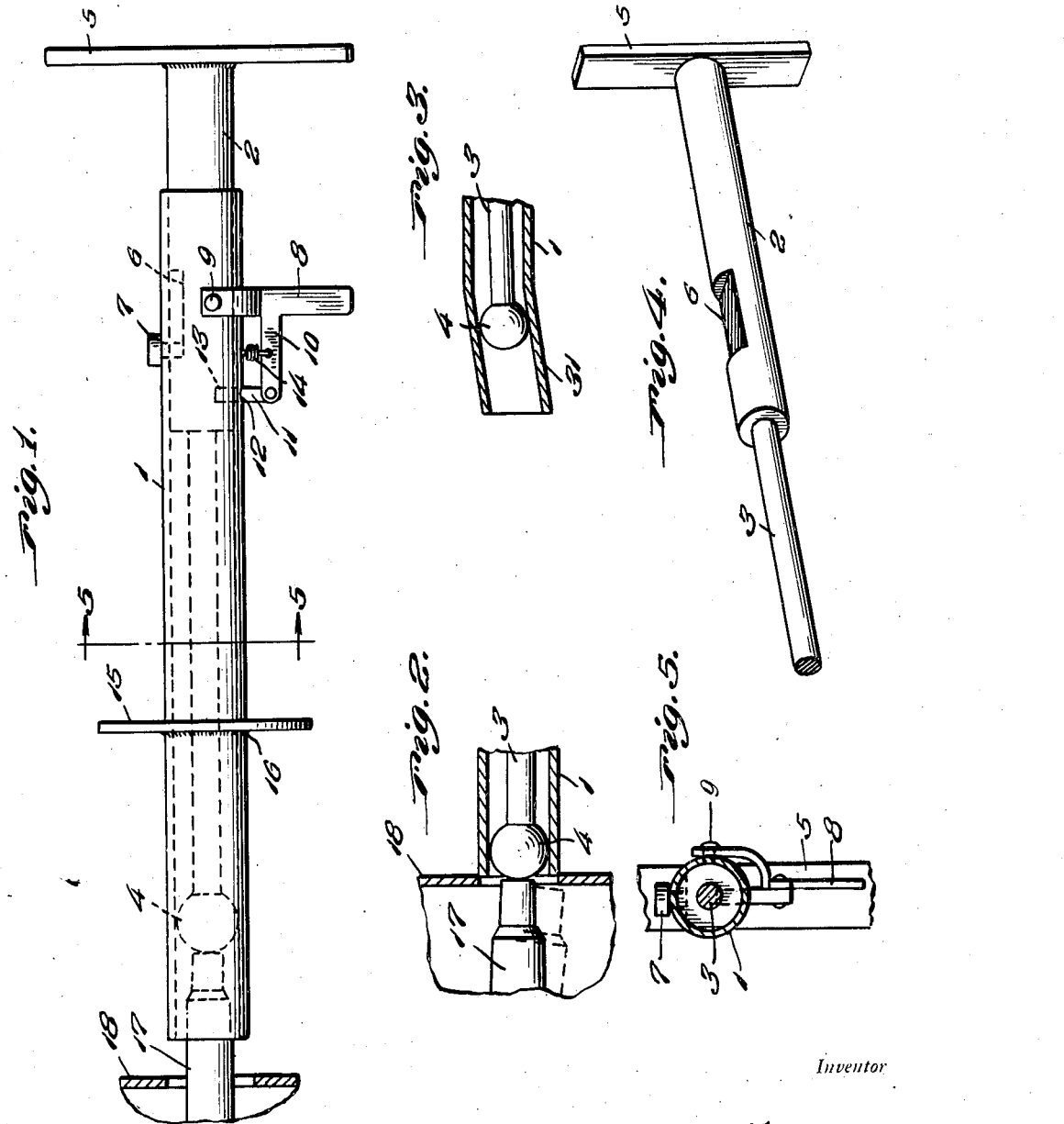
Inventor
Ivan N. Hewitt
By Clarence A. O'Brien
and Harvey B. Jacobson
Attorneys

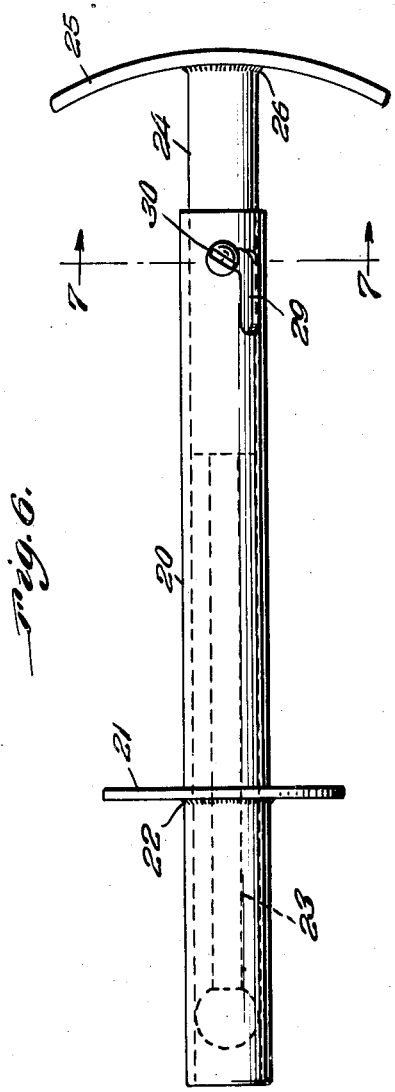
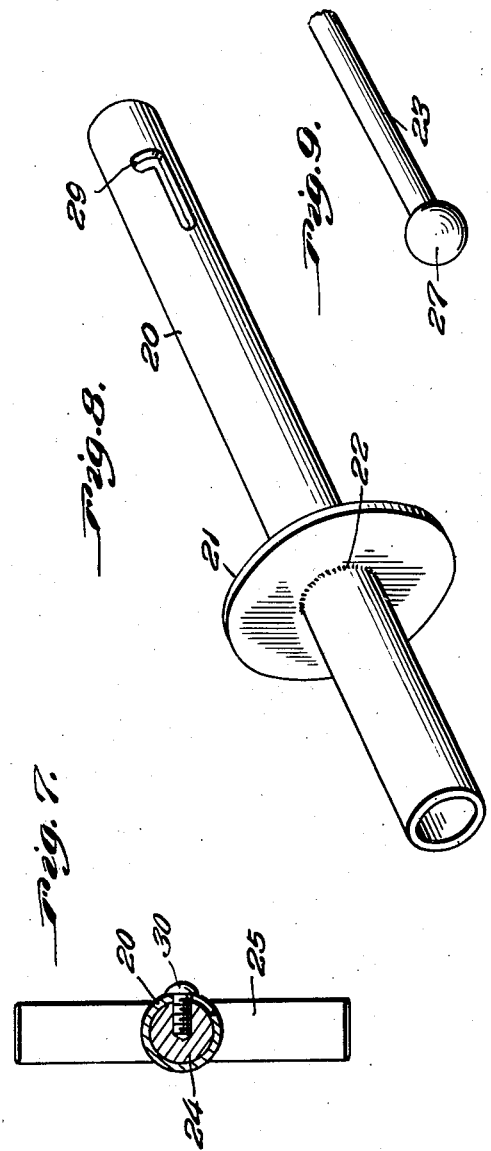

Patented Aug. 30, 1949

2,480,366

UNITED STATES PATENT OFFICE 2,480,366

VALVE STEM PUSHING IMPLEMENT

Ivan N. Hewitt, Medicine Lodge, Kans.

Application January 16, 1946, Serial No. 641,568

1 Claim. (Cl. 81—3)

This invention relates to improvements in valve stem pushers, and more particularly to an implement used in pushing an inner tube valve stem through the aperture in a truck wheel rim, when a tire casing is to be changed.

An object of the invention is to provide an improved valve stem pushing implement in which the outer end of a valve stem may be inserted and engaged by a headed plunger, whereby when force is applied to the handle on the outer end of the plunger, the valve stem will be forced through the valve stem receiving aperture in a truck rim to facilitate the demounting of the tire casing.

A further object of the invention is to provide an improved valve stem pushing implement which will be highly efficient in use and relatively inexpensive to manufacture and produce.

Other objects will appear as the description proceeds.

In the accompanying drawings which form a part of this application.

Figure 1 is a side elevation of the improved valve stem pushing implement;

Figure 2 is a detail sectional view showing the valve stem engaged by the adjacent end of the valve pushing implement and having been pushed from the tire rim;

Figure 3 is a modification of the outer end of the tire pushing implement;

Figure 4 is a perspective view of the plunger and pusher rod which is slidably supported in the housing of the valve stem pushing implement;

Figure 5 is a partial sectional view taken on the line 5—5 of Figure 1;

Figure 6 is a modified form of the valve stem pushing implement;

Figure 7 is a sectional view taken on the line 7—7 of Figure 6;

Figure 8 is a perspective view of the casing or housing of the modified form of valve stem pushing implement, and Figure 9 is a perspective view of the outer end of pusher rod with ball head disclosed thereon.

Like characters of reference are used throughout the following specification and the accompanying drawings to designate corresponding parts.

The preferred form of the invention is illustrated in Figure 1 of the drawings and includes a tubular casing or housing 1 in which a plunger 2 is slidably received. The plunger 2 is formed with a reduced forwardly extending pusher rod 3, at the end of which a round or ball shaped valve stem engaging head 4 is secured. A flat handle 5 is suitably secured to the outer end of the plunger 2 and extends at right angles thereto.

The plunger 2 is notched out as at 6, and cooperates with the stop screw 7 extending through the casing or housing 1 and into said notch 6, to limit the longitudinal movement of said plunger in the housing.

An offset finger operated lever 8 is pivoted at 9 to the side of the housing 1 and depends below the same. A forwardly extending arm 10 is formed integrally with the lever 8 and pivotally supports the locking detent 11 which is adapted to be directed upwardly through an aperture 12 in the housing 1, and into a locking recess 13 in said plunger 2, under the action of the coil spring 14 extending between and secured to the housing 1 and the forwardly extending arm 10, thus holding the several parts in their projected positions.

A hand engaging annular flange 15 is secured about the housing 1 adjacent the forward end thereof by welding 16, or in any other desired manner.

In operation the plunger of the implement is retracted and locked by the locking detent 11 being seated in the locking recess 13, whereupon the forward end of the housing is placed over the valve stem 17 and by placing one hand on the flange or collar 15 and pushing thereon while releasing the locking detent 11 by pulling back on the lever 8, and at the same time pushing on the handle 5, the headed plunger will be projected forwardly in the housing 1 to push the valve stem 17 free from the aperture in the tire rim 18, as illustrated in Figure 2 of the drawings.

The inner end 19 of the housing 1 may be slightly bent if desired, as shown in Figure 3 of the drawings, to better get to the valve stem to work on it.

A modified form of the invention is shown in Figures 6, 7, 8 and 9, and includes a valve or tubular housing 20 for the improved valve stem pushing implement, the same being open at its opposite ends and provided with an annular flange 21 welded at 22 to a point adjacent the inner end of said housing, said flange providing an engaging means for applying pressure when forcing the implement against a stuck valve stem.

A valve stem pusher rod 23 of reduced size is formed on the end of the plunger 24 which is slidably received in the housing 20 for reciprocating movement therein, and a handle 25 is welded at 26 to the outer end of the plunger 24, or attached thereto in any desired manner. A rounded head 27 is formed on the end of the pusher rod 23, and is adapted to be engaged by the outer end of a valve stem 17 when inserted within the end of the implement housing 20.

A bayonet joint slot 29 is formed in the housing 20 adjacent its outer end and cooperates with the shank of the screw 30 which extends through said slot 29 and is threaded into the plunger 24.

When it is desired to free a stuck valve stem, the implement is adjusted so that the plunger is in its retracted position, as shown in Figure 6 of the drawings, at which time the forward end of the housing will be placed over the end of the valve stem, and pressure will be applied with one hand on the collar 21 while the handle 25 is rotated with respect to the housing 20 to free the screw 30 from the bayonet joint, at which time pressure is also applied to the said handle to force the plunger forwardly in the housing, thereby also forcing the valve stem free from the aperture in the tire rim.

While the preferred embodiment of the invention has been illustrated and described, it will be understood that it is not intended to limit the scope of the invention to this disclosure, as many minor changes and detail of construction may be resorted to without departure from the spirit of the invention.

Having thus described my invention what I claim as new and desire to secure by Letters Patent of the United States is:

A tool for freeing an inner tube valve from the rim of an automobile tire including an elongated tubular housing adapted to have one end thereof disposed over the valve to be freed, a plunger slidably disposed in said tubular housing, said plunger being formed with a locking recess in its side wall, a handle formed on the outer end of said plunger, a reduced pusher rod formed on the inner end of said plunger, a round bearing and valve engaging head on the inner end of said reduced pusher rod, a hand engaging annular tool positioning flange secured about the inner end of said tubular housing, said tubular housing being formed with an aperture alignable with the locking recess in said plunger, an actuating lever pivotally supported on said tubular housing, resilient means for tensioning the operation of the same, and a locking detent pivotally supported by said actuating lever disposable through said aperture and receivable in said locking recess when the same are in alignment for holding the plunger in retracted position.

IVAN N. HEWITT.

REFERENCES CITED

The following references are of record in the file of this patent:

UNITED STATES PATENTS

| Number | Name | Date |
| --- | --- | --- |
| 512,381 | Keyes | Jan. 9, 1894 |
| 845,180 | Krafft | Feb. 26, 1907 |
| 1,415,865 | Brown | May 16, 1922 |
| 1,421,987 | Quinn | July 4, 1922 |
| 1,492,423 | Cartwright | Apr. 29, 1924 |
| 1,539,221 | Tennant | May 26, 1925 |
| 1,612,124 | Huelsick | Dec. 28, 1926 |
| 1,837,899 | Daugy | Dec. 22, 1931 |
| 2,080,526 | Bedford | May 18, 1937 |